US005526419A

United States Patent [19]
Allen et al.

[11] Patent Number: 5,526,419
[45] Date of Patent: Jun. 11, 1996

[54] BACKGROUND NOISE COMPENSATION IN A TELEPHONE SET

[75] Inventors: Jonathan B. Allen, Mountainside; Donald J. Youtkus, Scotch Plains, both of N.J.

[73] Assignee: At&T Corp., Murray Hill, N.J.

[21] Appl. No.: 175,038

[22] Filed: Dec. 29, 1993

[51] Int. Cl.⁶ .................................................. H04M 1/60
[52] U.S. Cl. ...................... 379/387; 379/389; 379/390; 379/391; 381/94; 381/108; 381/71
[58] Field of Search ................................. 379/387, 389, 379/390, 391, 433, 419; 381/71, 72, 106, 84, 157, 41, 91, 57, 94, 108

[56] References Cited

U.S. PATENT DOCUMENTS

| | | | |
|---|---|---|---|
| 3,963,868 | 6/1976 | Randmere et al. | 179/1 |
| 4,048,443 | 9/1977 | Crochiere et al. | 381/37 |
| 4,076,968 | 2/1978 | Watenbarger | 179/84 |
| 4,254,303 | 3/1981 | Takizawa | 179/1 |
| 4,604,501 | 8/1986 | Richmond et al. | 179/81 |
| 4,628,526 | 12/1986 | Germer | 381/57 |
| 4,715,063 | 12/1987 | Haddad et al. | 379/390 |
| 4,796,287 | 1/1989 | Reesor et al. | 379/390 |
| 4,829,565 | 5/1989 | Goldberg | 379/390 |
| 4,882,762 | 11/1989 | Waldhauer | 381/106 |
| 4,891,837 | 1/1990 | Walker et al. | 379/390 |
| 4,908,855 | 3/1990 | Ohga et al. | 379/387 |
| 5,001,763 | 3/1991 | Moseley | 381/71 |
| 5,117,461 | 5/1992 | Moseley | 381/72 |
| 5,134,659 | 7/1992 | Moseley | 381/72 |
| 5,138,663 | 8/1992 | Moseley | 381/71 |
| 5,138,664 | 8/1992 | Kimura et al. | 381/72 |
| 5,170,430 | 12/1992 | Schub | 379/389 |
| 5,239,578 | 8/1993 | Reegen et al. | 379/387 |
| 5,319,736 | 6/1994 | Hunt | 381/41 |
| 5,353,376 | 10/1994 | Oh et al. | 381/41 |

OTHER PUBLICATIONS

I. Pollack, "Speech Communication at High Noise Levels: The Roles of a Noise–Operated Automatic Gain Control System and Hearing Protection," *The Journal of the Acoustical Society of America*, vol. 29, No. 12, Dec. 1957, pp. 1324–1327.

R. J. Niederjohn et al., "The Enhancement of Speech Intelligibility in High Noise Levels by High–Pass Filtering Followed by Rapid Amplitude Compression," *IEEE Transactions on Acoustics, Speech, and signal Processing*, vol. ASSP–24, No. 4, Aug. 1976, pp. 277–282.

*Primary Examiner*—Jeffery A. Hofsass
*Assistant Examiner*—Jacques M. Saint-Surin
*Attorney, Agent, or Firm*—Kenneth M. Brown

[57] ABSTRACT

An automated method for modifying a speech signal communicated over a telephone network by applying a gain factor in a telephone set before any side tone is added thereto. The gain factor is a function of a received signal indicative of the background noise at the location of the telephone set. The gain applied may be a function of both the background noise level and the original speech signal. Either a linear or a non-linear (e.g., compressed) amplification of the original speech signal may be performed, where a compressed amplification results in the higher level portions of the speech signal being amplified by a smaller gain factor than lower level portions. The speech signal may be separated into a plurality of subbands, each resultant subband signal being individually modified in accordance with the present invention. In this case, each subband speech signal is amplified by a gain factor based on a corresponding subband noise signal, generated by separating the background noise signal into a corresponding plurality of subbands. The individual modified subband signals may then be combined to form the resultant modified speech signal.

15 Claims, 5 Drawing Sheets

BACKGROUND NOISE COMPENSATION IN A TELEPHONE SET

CROSS-REFERENCE TO RELATED AND APPLICATION

The subject matter of this application is related to the currently pending U.S. patent application of J. B. Allen and D. J. Youtkus entitled "Background Noise Compensation in a Telephone Network, Ser. No. 08/175,075, filed on even date herewith and assigned to the assignee of the present invention.

FIELD OF THE INVENTION

The present invention relates generally to the field of telephone sets connected to a telephone network and specifically to the problem of using a telephone in a noisy environment.

BACKGROUND OF THE INVENTION

When a person uses a telephone in a noisy environment such as a noisy room, an airport, a car, a street corner or a restaurant, it can often be difficult to hear the person speaking at the other end (i.e., the "far-end") of the connection over the background noise present at the listener's location (i.e., the "near-end"). In some cases, due to the variability of human speech, the far-end speaker's voice is sometimes intelligible over the near-end background noise and sometimes unintelligible. Moreover, the noise level at the near-end may itself vary over time, making the far-end speaker's voice level at times adequate and at times inadequate.

Although some telephones provide for control of the volume level of the telephone loudspeaker (i.e., the earpiece), such control is often unavailable. Moreover, manual adjustment of a volume control by the listener is undesirable since, as the background noise level changes, the user will want to readjust the manual volume control in an attempt to maintain a preferred listening level. Generally, it is likely to be considered more desirable to provide an automatic (i.e., adaptive) control mechanism, rather than requiring the listener first to determine the existence of the problem and then to take action by adjusting a manual volume control. One solution which attempts to address this problem has been proposed in U.S. Pat. No. 4,829,565, issued on May 9, 1989 to Robert M. Goldberg, which discloses a telephone with an automated volume control whose gain is a function of the level of the background noise.

SUMMARY OF THE INVENTION

We have recognized that the use of either conventional manual volume controls or an automatic mechanism such as that disclosed in the above-cited U.S. Pat. No. 4,829,565 fails to adequately solve the background noise problem. In particular, these approaches fail to recognize the fact that by amplifying the signal which supplies the handset receiver (i.e., the loudspeaker), the side tone is also amplified. (The side tone is a well-known feed-through effect in a telephone. A portion of the input signal from the handset transmitter—i.e., the microphone—is mixed with the far-end speech signal received from the network. The resultant, combined signal is then supplied to the handset loudspeaker.) Since the side tone contains the background noise, itself, the background noise is, disadvantageously, amplified concurrently with the far-end speech signal whenever such a volume control (either manual or automatic) is used to amplify the signal which supplies the handset receiver. By amplifying both the speech signal and the noise together, the degrading effect of the noise can actually become worse because of the properties of the human ear.

In accordance with the present invention, a modified speech signal is produced from an original speech signal in a telephone set before the side tone has been combined therewith. Specifically, a gain factor is applied to the original speech signal to produce the modified speech signal. The gain factor is a function of a received signal indicative of the background noise at the given destination at which the telephone set is located. The side tone may then be combined with the modified speech signal.

The gain factor may be a function of the level of the background noise, or it may be a function of both the level of the background noise and the level of the original (i.e., the tar-end) speech signal. The modified speech signal may comprise a linear amplification of the original speech signal or it may comprise an amplified and "compressed" version of the original speech signal. By "compressed" it is meant that the higher level portions of the original signal are amplified by a smaller gain factor than are the lower level portions.

In accordance with one illustrative embodiment, the original speech signal may be separated into a plurality of subbands, and each resultant subband signal may be individually modified (e.g., amplified) in accordance with the technique of the present invention. In particular, these original subband speech signals may be amplified by a gain factor which is a function of a corresponding subband-noise-indicative signal. Such subband-noise-indicative signals may be generated by separating the signal indicative of the background noise into a corresponding plurality of subbands. The individual modified subband signals may then be combined to form the resultant modified speech signal. The modified speech signal may then be combined with the side tone.

As used herein, the term "telephone set" is intended to include any apparatus for use by one party in providing a two-way speech communication linkage between the user and another party, wherein the apparatus has the effect (intentionally or unintentionally) of combining a side tone with the received signal. Examples of such devices include conventional desk-top or other corded telephone sets, cordless and cellular telephones, and headsets (such as those commonly used by pilots, telephone operators, air traffic controllers, police dispatchers, etc.). The telephone set may be connected to the other party by any conventional (or non-conventional) telephone network means. As used herein, the term "telephone network" is intended to include conventional terrestrial telephone networks (local or long distance), wireless (including cellular) communication networks, radio transmission, satellite transmission, microwave transmission, fiber optic links, etc., or any combination of any of these transmission networks.

DETAILED DESCRIPTION

Introduction

The present invention improves the signal-to-noise ratio (SNR) of a far-end speaker's speech in the near-end listener's ear when the near-end listener is using a telephone in a noisy environment. The level of the noise in the ear of the near-end listener can be estimated from the signal levels picked up by the transmitter (microphone) in the near-end listener's handset. Based on these levels, the original speech signal generated by the far-end speaker may be modified within the telephone by being amplified by a variable gain factor so as to provide a more intelligible signal to the listener. This modification may advantageously also be a function of the level of the original speech signal itself. For example, the speech power level (i.e., a "long-term" average level of the original speech signal) may be incorporated into the determination of the gain factor. In this manner, relatively quiet signals may be boosted (i.e., amplified) by a larger gain factor than relatively loud signals.

Moreover, the modification of the speech signal may comprise either a linear amplification or a non-linear, (illustratively) compressed, amplification. Compressed amplification, in particular, boosts loud portions of the original speech signal by a lesser amount (i.e., with a smaller gain factor) than quiet portions. Thus, it is possible in this manner to, on a short-term basis, boost the signals which fall below the background noise level without boosting the signals which are already significantly above the background noise level. Simple linear amplification, by contrast, boosts all signal levels by an equal amount. When used to boost low-level signals above the background noise, linear amplification can in some circumstances result in distortion, since the higher level signals (already above the noise) could receive excessive amplification.

Figure 1:
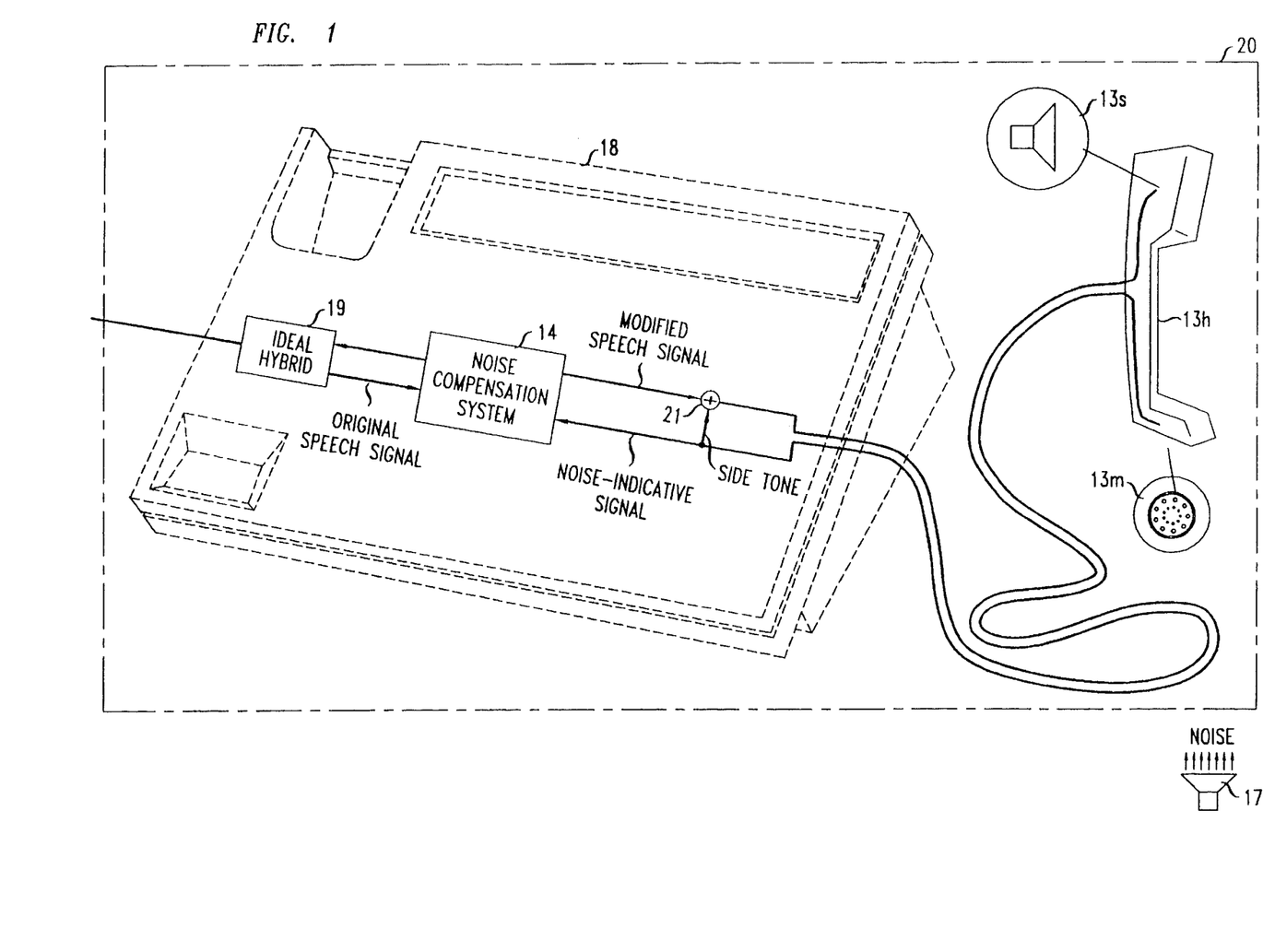
FIG. 1 shows a telephone set which includes a noise compensation system in accordance with an illustrative embodiment of the present invention.

FIG. 1 shows telephone set 20 which includes a noise compensation system embodying the principles of the present invention. Specifically, telephone set 20 of FIG. 1 comprises a deskset 18 and a handset 13h (having microphone 13m and loudspeaker 13s). Included within deskset 18 is noise compensation system 14. For illustrative convenience, the cord which connects handset 13h to deskset 18 is shown as emanating from the right side of deskset 18, even though such cords most commonly emanate from the left side of a deskset.

Deskset 18 further includes ideal hybrid 19 and side tone adder 21. Ideal hybrid 19 converts between standard two-wire and four-wire telephone lines. It is ideal in that it substantially isolates the incoming signal from the outgoing signal on its four-wire side. In this manner, there is essentially no side tone component to the original speech signal which emanates from the four-wire side of the hybrid. Side tone adder 21 combines the signal from microphone 13m with the incoming (far-end) speech signal before it is provided to loudspeaker 13s. In particular, a reduced level of the signal from microphone 13m is mixed with the speech signal. Thus, a side tone is provided to the loudspeaker. Ideal hybrids and side tone adders are conventional components which may be found, for example, in certain electronic telephone sets. Other conventional components of a telephone set which are not relevant to the present invention are not shown.

Noise compensation system 14 receives a noise-indicative signal from microphone 13m which is representative of the background noise (as illustrated as emanating from loudspeaker 17) as well as any speech provided to microphone 13m by the telephone user. Noise compensation system 14 also receives the original speech signal from a far-end speaker (whose telephone and the network connection thereto are not shown). Noise compensation system 14 determines the level of background noise from the noise-indicative signal, and boosts the original speech signal by a gain factor based on the background noise level to produce a modified speech signal. The side tone is then added to the modified speech signal by side tone adder 21, and the resultant signal is then provided to loudspeaker 13s in handset 13h. Note that the original speech signal as provided to noise compensation system 14 is substantially free of the background noise, since the side tone has not yet been added to the original (far-end) speech signal. Thus, the far-end speech is boosted without any simultaneous boost of the background noise in the side tone.

An Illustrative Broadband Implementation with Linear Amplification

Figure 2:
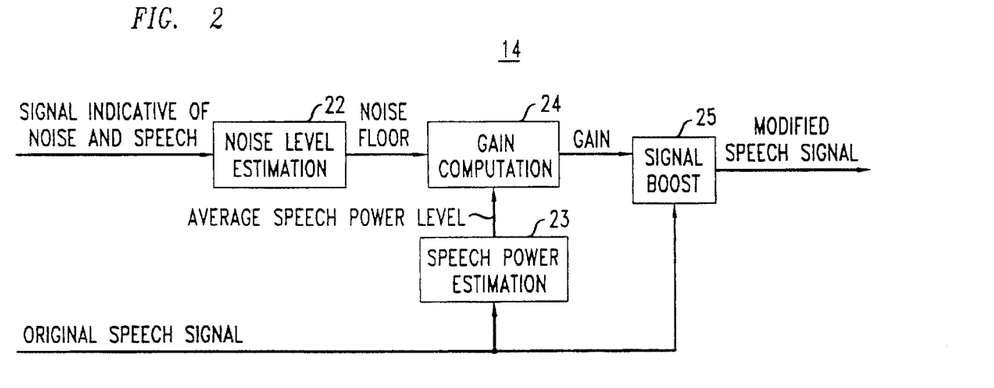
FIG. 2 shows a system-level diagram of a broadband-based illustrative embodiment of a noise compensation system in accordance with the present invention.

FIG. 2 shows a system-level diagram of a broadband-based illustrative embodiment of noise compensation system 14. Inputs to the system include the original speech signal and the noise-indicative signal, which may further include speech provided by the near-end listener. The system produces a modified speech signal for improved intelligibility as output. All of the signals described with reference to the illustrative embodiment present herein are presumed to be in digital form.

Based on the noise-indicative signal, noise level estimation 22 determines the "noise floor" and outputs a signal representing that value. In particular, this signal represents the noise level over a first predetermined period of time. By setting this first predetermined period to a relatively short value (e.g., 250 milliseconds or less), the determined noise floor will substantially follow changing levels of background noise in the near-end environment. Specifically, the noise floor signal represents a short-term (e.g., 250 milliseconds) minimum value of an "exponentionally mapped past average" signal, and can be generated using known techniques. An illustrative implementation of noise level estimation 22 is shown in FIG. 3 and described below.

Figure 4:
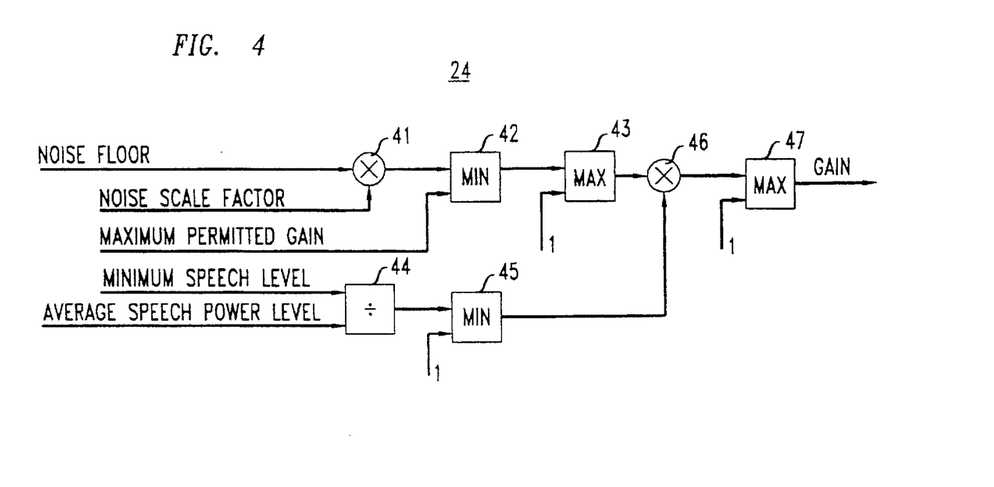
FIG. 4 shows an illustrative implementation of the gain computation unit of the system of FIG. 2.

Gain computation 24 produces a gain signal, GAIN, whose value is proportional to the noise floor signal and inversely proportional to an average speech power level signal. This gain signal represents a gain factor (i.e., a multiplicative factor) by which the original speech signal may be amplified. The average speech power level signal is generated by speech power estimation 23, and represents the average level of the original speech signal over a second predetermined period of time. That is, the average speech power level measures the "energy" level of the speech signal. Providing such a gain dependence on the far-end speech level allows relatively quiet calls to receive a sufficient boost for a given background noise level, while preventing loud calls from being over-boosted. By setting the second predetermined period to a relatively long value (e.g., one second), it can more readily be determined whether the current far-end speech comprises a loud or soft segment of the call. Thus, the average speech power level signal represents a long-term average level. Speech power estimation 23 may be implemented by conventional signal energy estimation techniques. An illustrative implementation of gain computation 24 is shown in FIG. 4 and described below.

Figure 7:
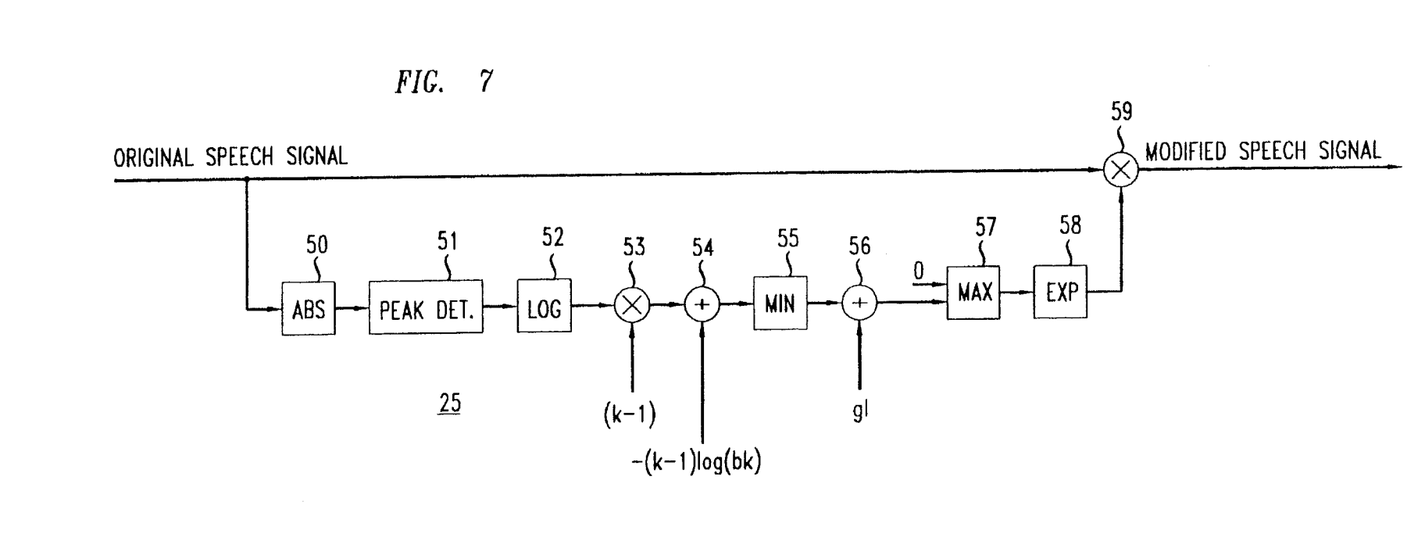
FIG. 7 shows an illustrative implementation of the signal boost unit of an embodiment of the system of FIG. 2 applying a compressed amplification as shown in the graphs of FIGS. 5 and 6.

The gain signal and the original speech signal are provided to signal boost 25 which produces the modified speech signal. Where only linear amplification is desired, signal boost 25 may comprise a conventional amplifier (i.e., a multiplier). In this case, the original speech signal is amplified by a gain factor equal to the value of the gain signal, GAIN. Where, on the other hand, compressed amplification is desired, signal boost 25 may comprise circuitry (or procedural code) which amplifies the original speech signal by a gain factor less than or equal to the value of the gain signal, wherein the gain factor further depends on the level of the original speech signal itself. That is, the gain signal, GAIN, represents the maximum gain which will be applied by the "compressor." An illustrative implementation of signal boost 25 providing compression is shown in FIG. 7 and described below.

Figure 3:
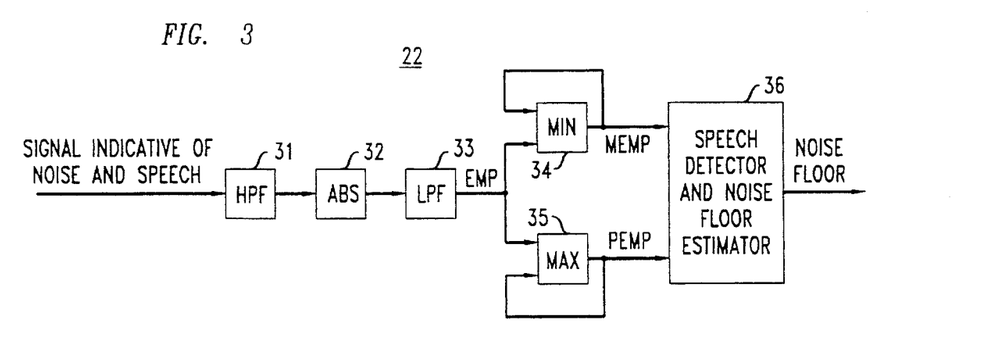
FIG. 3 shows an illustrative implementation of the noise level estimation unit of the system of FIG. 2.

FIG. 3 shows an illustrative implementation of noise level estimation 22 of the system of FIG. 2. First, high pass filter (HPF) 31 removes DC from the input signal. It may be conventionally implemented as a first order recursive digital filter having a cutoff frequency of, for example, 20 Hz, and may be based on a standard telephony sampling frequency of 8 kHz. Absolute value block (ABS) 32 computes the magnitude of the sample and is also of conventional design. Low pass filter (LPF) 33 computes the exponentially mapped past average (EMP). As described above, the exponentially mapped past average comprises an exponentially weighted average value of the noise level. Low pass filter 33 is also of conventional design and may illustratively be implemented as a first order recursive digital filter having the transfer function $y(n)=(1-\beta) x(n)+\beta y(n-1)$, where $\beta=e^{-T/\tau}$, with T a sampling period and $\tau$ a time constant. Illustratively, T=0.125 ms and $\tau$=16 ms.

Minimum sample latch (MIN) 34 stores the minimum value of EMP over the first predetermined time period (e.g., 250 milliseconds). The output signal of latch 34, MEMP, therefore represents the short-term minimum of the exponentionally mapped past average, and thus represents the short-term minimum value of the averaged noise-indicative signal. This signal is subsequently used to represent the noise floor over which far-end speech should be boosted. In a corresponding manner, maximum sample latch (MAX) 35 stores the maximum value of EMP over the same predetermined period. The output signal of latch 35, PEMP, therefore represents the short-term peak of the exponentionally mapped past average, and thus represents the short-term peak value of the averaged noise-indicative signal. Latches 34 and 35 may be implemented by conventional digital comparators, selectors and storage devices, with the storage devices reset at the start of each cycle of the predetermined time period.

Speech detector and noise floor estimator 36 generates the noise floor signal output based on signals MEMP and PEMP. Specifically, it performs two functions. First, it is determined whether the noise-indicative signal presently includes only noise or whether it presently includes speech as well. This question may be resolved by conventional techniques, such as those used in the implementation of conventional speakerphones. For example, the quotient of PEMP (representing the short-term peak value of the noise-indicative signal) divided by MEMP (representing the short-term minimum value of the noise-indicative signal) may be compared with a predetermined threshold. The larger this quotient, the larger the variability in the level of the input signal. If the level of the input signal is sufficiently variable within the first predetermined time period, it is presumed that speech is present. (Note that the variation in signal level of speech typically exceeds that of background noise.)

Second, speech detector and noise floor estimator 36 sets the output noise floor signal to a value which represents the estimated level of the noise floor. If it is determined that speech is not present, the noise floor signal is set to MEMP, the short-term minimum value of the noise-indicative signal. Otherwise, the noise floor signal remains unchanged—that is, the previous value is maintained. In this manner, when the presence of speech makes it difficult to determine the actual present level of background noise, it is presumed that the noise level has not changed since the previous period.

In one alternative embodiment, the value of PEMP alone may be compared with a predetermined threshold (rather than using the quotient of PEMP divided by MEMP), since speech is generally of a significantly higher intensity than is background noise. And in a second alternative embodiment, speech detection may be bypassed altogether, on the assumption that the far-end speaker will not be speaking at the same time that the near-end listener is speaking. In other words, we may not care what the "noise floor" is determined to be during periods when the near-end listener is speaking. In this second alternative embodiment, maximum sample latch 35 and speech detector and noise floor estimator 36 may be removed from noise level estimation 22 of FIG. 3, and the output of minimum sample latch 34 (i.e, signal MEMP) may be used directly as the noise floor signal output of noise level estimation 22.

FIG. 4 shows an illustrative implementation of gain computation 24 of the system of FIG. 2. The gain signal is generated based on the noise floor signal from noise level estimation 22 and on the average speech power level signal from speech power estimation 23. Specifically, the computed gain is advantageously proportional to the noise floor and inversely proportional to the average speech power level. Moreover, the gain is never less than one (i.e., the original speech signal is never attenuated) nor is it ever more than a maximum specified value.

First, amplifier 41 multiplies the noise floor by a noise scale factor. This noise scale factor is set to an appropriate value so that the output signal of amplifier 41, which is representative of a gain factor, is of the appropriate magnitude. In particular, the noise scale factor acts as a "sensitivity" control—a smaller scale factor will result in more gain being applied for a given level of background noise. The magnitude of this signal may be advantageously set to that gain factor which will boost the lowest far-end speech levels by an appropriate amount to overcome the noise level. For example, the noise scale factor may illustratively be set to a fractional value between zero and one, such as 0.4.

Next, minimizer (MIN) 42 compares the gain factor output by amplifier 41 to a maximum permitted gain factor to ensure that the system does not attempt to apply an excessive gain factor to the original speech signal. For example, the maximum permitted gain factor may illustratively be set to 5.6 (i.e., 15 dB). Maximizer (MAX) 43 then ensures that the resultant gain factor is in no case less than one, so that the original speech signal is never attenuated.

Divider 44 and minimizer (MIN) 45 determine an additional multiplicative factor to be incorporated in the gain computation so that the resultant gain will be inversely proportional to the average speech power level as provided by speech power estimation 23. Divider 44 computes the quotient of a minimum far-end speech level divided by the average speech power level for use as this additional multiplicative factor. The minimum speech level represents the minimum level which is to be considered actual far-end speech, as distinguished from mere background noise during a period of silence by the far-end speaker. For example, the minimum speech level may illustratively be set to a value representing −30 dBm. Minimizer 45 then ensures that this multiplicative factor does not exceed one. In this manner, the gain factor is not increased as the far-end speech level goes below the minimum, so that far-end background noise is not over-boosted (i.e., not boosted more than the quietest speech).

Amplifier 46 multiplies the gain factor generated by amplifier 41 (through minimizer 42 and maximizer 43) by the additional multiplicative factor from divider 44 (through minimizer 45). Finally, maximizer (MAX) 47 ensures that the final gain factor is not less than one, so that the original speech signal is never attenuated. Thus, the resultant gain factor, GAIN, is proportional to the noise floor level and inversely proportional to the average speech power level, but neither less than one nor more than the specified maximum.

An Illustrative Broadband Implementation with Compressed Amplification

As described above, the technique of compressed amplification results in the application of more gain to lower energy signals than to higher energy signals. This helps to compensate for the listener's reduced dynamic range of hearing and undue growth of loudness which results from the presence of surrounding noise. Since lower energy signals tend to be masked by noise more than higher energy signals, the higher energy signals require less amplification. Moreover, this compression avoids distorting the speech by avoiding over-amplification of the high energy signals. Thus, the speech intelligibility is increased without the unwanted side effect of over-amplifying those sounds which are already sufficiently loud.

Figure 5:
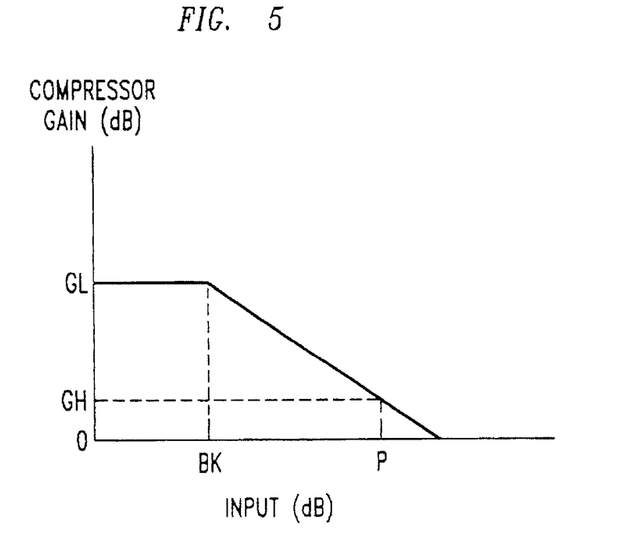
FIG. 5 is a graph which shows a compressor gain which may be applied to the original speech signal by the signal boost unit of the system of FIG. 2 applying compressed amplification.
Figure 6:
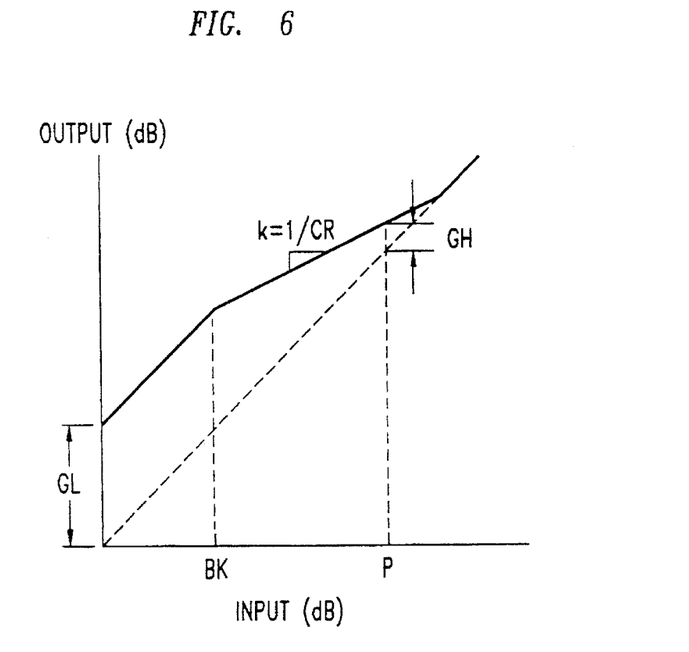
FIG. 6 is a graph of the corresponding transfer function for the illustrative signal boost unit which results from applying the gain shown in FIG. 5.

FIG. 5 is a graph which shows a compressor gain which may be applied to the original speech signal by the signal boost unit of an illustrative embodiment of the system of FIG. 2 applying compressed amplification. FIG. 6 is a graph which shows the corresponding transfer function for the illustrative signal boost unit which results from applying the gain shown in FIG. 5. As shown, the gain (in decibels, or dB) to be applied varies from GL, a predetermined "low-level" gain which is applied to the lowest energy signals, down through GH, a "high-level" gain, to no gain at all (i.e., 0 dB) at the highest energy signals. The low-level gain, GL, may be based on the output of gain computation 24, GAIN, as shown in FIG. 4 and described above. In particular, where GAIN reflects a maximum gain factor and GL reflects a gain in decibels, it can be readily seen that GL=20 log (GAIN). Note from the graphs of FIGS. 5 and 6 that the gain advantageously remains non-negative, thus ensuring that the signal is never attenuated.

The compressor "breakpoint," BK, is an original speech signal level threshold below which the gain applied remains constant. That is, signals below BK receive a linear boost while only those above BK are in fact compressed. By keeping the gain applied constant below this threshold, very low level signals, which likely represent only background noise at the far end (rather than actual far-end speech), will not be excessively amplified (i.e., will not be boosted more than the lowest level speech signals), while low level speech signals will still receive sufficient boost. P represents a point at which a high-level gain, GH, may be defined. Both the compressor breakpoint BK and the point P may be advantageously chosen so that most of the dynamic range of the original speech signal falls between BK and P. Thus, the low-level gain GL will be applied to the lowest level speech signals, while the high-level gain, GH, will be applied to the highest level speech signals. For example, BK may be set at the minimum level which represents actual speech (as opposed to far-end background noise). P, for example, may be set at a speech level which is exceeded only 10% of the time. Alternatively, since speech typically has an energy distribution that ranges over about 30 dB, either BK or P may be chosen as indicated above, and then the other parameter may be set 30 dB higher or lower, respectively.

FIG. 7 shows an illustrative implementation of the signal boost unit of the embodiment of the system of FIG. 2 applying a compressed amplification as shown in the graphs of FIGS. 5 and 6. The illustrative implementation comprises absolute value block (ABS) 50, peak detector 51, logarithm block (LOG) 52, multiplier 53, adder 54, minimizer (MIN) 55, adder 56, maximizer (MAX) 57, exponentiator (EXP) 58 and multiplier 59. As can be seen from the presence of logarithm block 52 and exponentiator 58, the computation of the compressed gain is primarily performed in the logarithmic domain. All of the individual components are of conventional design.

Specifically, absolute value block 50 computes the magnitude of the sample. Peak detector 51 controls the attack and release times of the compressor. For example, peak detector 51 may be advantageously designed so as to provide instantaneous attack but syllabic release. An instantaneous attack time enables the compressor gain to be reduced instantaneously if the input signal level suddenly rises. Therefore, sudden, loud noises are prevented from being over-amplified, thus avoiding causing pain or injury to the listener's ear. The compressor gain increases, however, at a rate dependent on the release time constant. The release time constant may be set, for example, to 16 milliseconds (or less) to respond to the fast energy changes associated with the phonemes of spoken language. Specifically, if x(n) represents the n'th input sample to peak detector 51 and y(n) represents the n'th output sample therefrom, peak detector 51 may be implemented by setting y(n)=x(n) if x(n)>y(n−1), and otherwise setting y(n)=βy(n−1), where $\beta=e^{-T/\tau}$, with T set equal to the sampling period (e.g., 0.125 milliseconds for telephony) and τ set equal to the release time constant (e.g., 25 milliseconds).

Logarithm block 52 converts the output signal of peak detector 51 into the logarithmic domain by taking the logarithm of the digital sample. Multiplier 53, adder 54 and minimizer 55 compute the relative reduction in gain which is to result from the compression. That is, the amount by which the resultant gain will be reduced from the low-level gain, GL, (which represents the maximum gain) is calculated by these components. Specifically, multiplier 53 multiplies the signal by the amount (k−1), where k is the reciprocal of the "compression ratio." The compression ratio, CR, represents the slope of the compressor gain curve as shown in FIG. 6, and may be easily calculated from the parameters BK, P, GL and GH (as defined above) as CR=1/k=(P−BK)(P−BK+GH−GL). Adder 54 then adds the (negative) amount—(k−1) log (bk) to the result from multiplier 53, where bk is the compressor breakpoint (i.e., BK) expressed as an absolute level on a linear scale. For example, if the speech signal magnitudes are in the range [0,R] on a linear scale and it is desired that the compressor breakpoint be placed a predetermined amount×dB down from R, then bk=R×$10^{(-x/20)}$. Minimizer 55 limits the result of the above computation to a value less than or equal to zero so that the final resultant compressed gain will never exceed the low-level gain, GL.

Adder 56 adds in the amount gl, which is the logarithm of the gain which is introduced by the compressor at all levels less than bk (i.e., the low-level gain). Thus, gl=log (GAIN)= GL/20. Maximizer 57 ensures that the final result (as computed in the logarithmic domain) remains greater than or equal to zero to ensure that the original speech signal is never attenuated. Exponentiator 58 converts the computed compressed gain back out of the logarithmic domain to produce the final gain factor (i.e., the compressed gain). Finally, multiplier 59 applies this (multiplicative) gain factor to the original speech signal to produce the modified speech signal.

An Alternative Illustrative Implementation of Compressed Amplification

Figure 8:
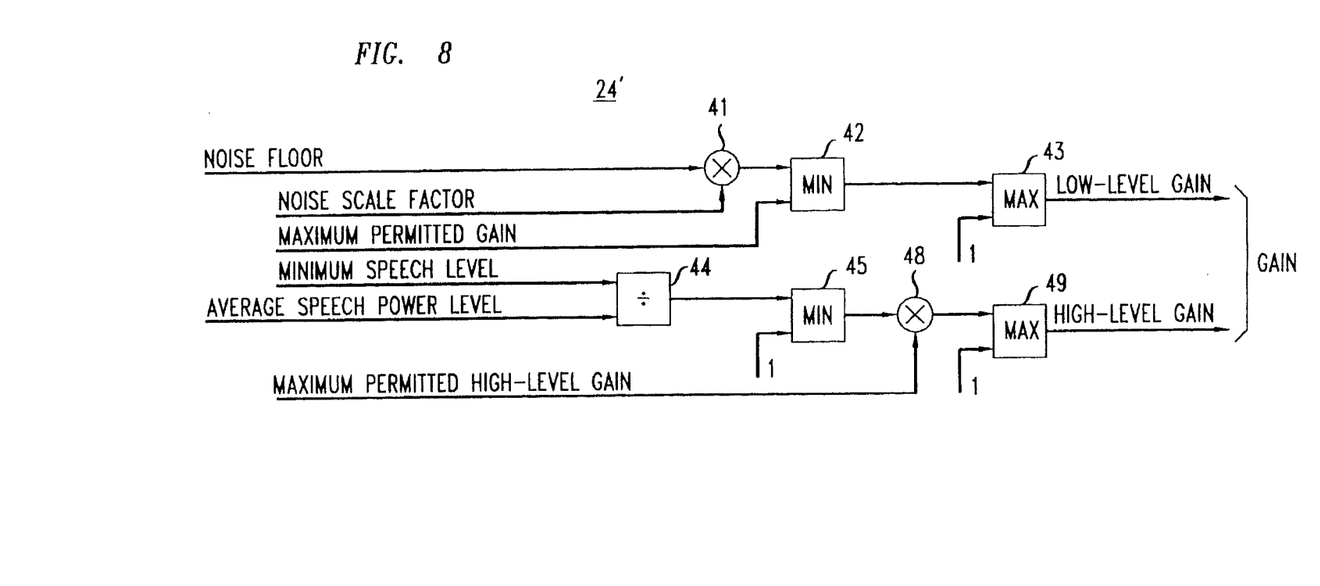
FIG. 8 shows an alternative illustrative implementation of the gain computation unit of FIG. 2 for use in an embodiment applying compressed amplification in an alternative manner.

FIG. 8 shows an alternative illustrative implementation of the gain computation unit of FIG. 2 for applying compressed amplification in a different manner than that described above. In gain computation 24' shown herein, the low-level gain, GL, of the compressor of signal boost 25 is varied only as a function of the background noise level (and not based on the average speech power level), while the high-level gain, GH, is varied as a function of the average speech power level. That is, the low-level gain is proportional (only) to the noise floor, and the high-level gain is inversely proportional (only) to the average speech power level. Thus, gain computation 24' produces an output (GAIN) comprising two "independent" gain factors, both of which are supplied to signal boost 25.

For example, if P is chosen to be set at a speech level which is exceeded only 10% of the time as suggested above, the result of this alternative implementation is that the effect of varying the low-level gain becomes essentially orthogonal to the effect of varying the high-level gain. In particular, varying the low-level gain will affect the intelligibility of the speech but the loudness will be relatively unaffected if the high-level gain remains constant. On the other hand, varying the high-level gain will affect the loudness of the speech but the intelligibility will be relatively unaffected if the low-level gain remains constant. Thus, the low-level gain becomes an intelligibility "control" and the high-level gain becomes a loudness "control." Advantageously, therefore, the illustrative implementation described herein increases the low-level gain as the background noise increases, while it increases the high-level gain as the far-end speech level decreases.

Specifically, in the alternative implementation of FIG. 8, amplifier 41, minimizer (MIN) 42 and maximizer (MAX) 43 produce a gain factor proportional to the noise floor in an analogous manner to the corresponding components of the implementation shown in FIG. 4. The same parameters—a noise scale factor and a maximum permitted gain factor— are employed in the same manner. The resultant signal in this case, however, is the final low-level gain factor to be provided to the compressor of signal boost 25.

Divider 44 and minimizer (MIN) 45 determine an alternative gain factor (inversely proportional to the average speech power level), also in an analogous manner to the corresponding components of the implementation shown in FIG. 4. Multiplier 48 then multiplies this factor (which is less than or equal to one) by a parameter representing the maximum permitted high-level gain factor to produce the high-level gain factor to be provided to the compressor of signal boost 25. For example, the maximum permitted high-level gain factor may advantageously be set to the low-level gain factor. Maximizer 49, like maximizer 43, ensures that the resultant gain factor is at least one, so that the original speech signal is never attenuated.

With the resultant gain factors as produced by gain computation 24', signal boost 25 may be implemented as shown in FIG. 7 and described above. In particular, the compression ratio, CR, may be readily computed as described above based on the low-level and high-level gain factors generated by gain computation 24'. The compressed gain may then be computed based on the values of k (1/CR), bk and gl (based in turn on the low-level gain factor) as described above.

An Illustrative Multiband Implementation

Figure 9:
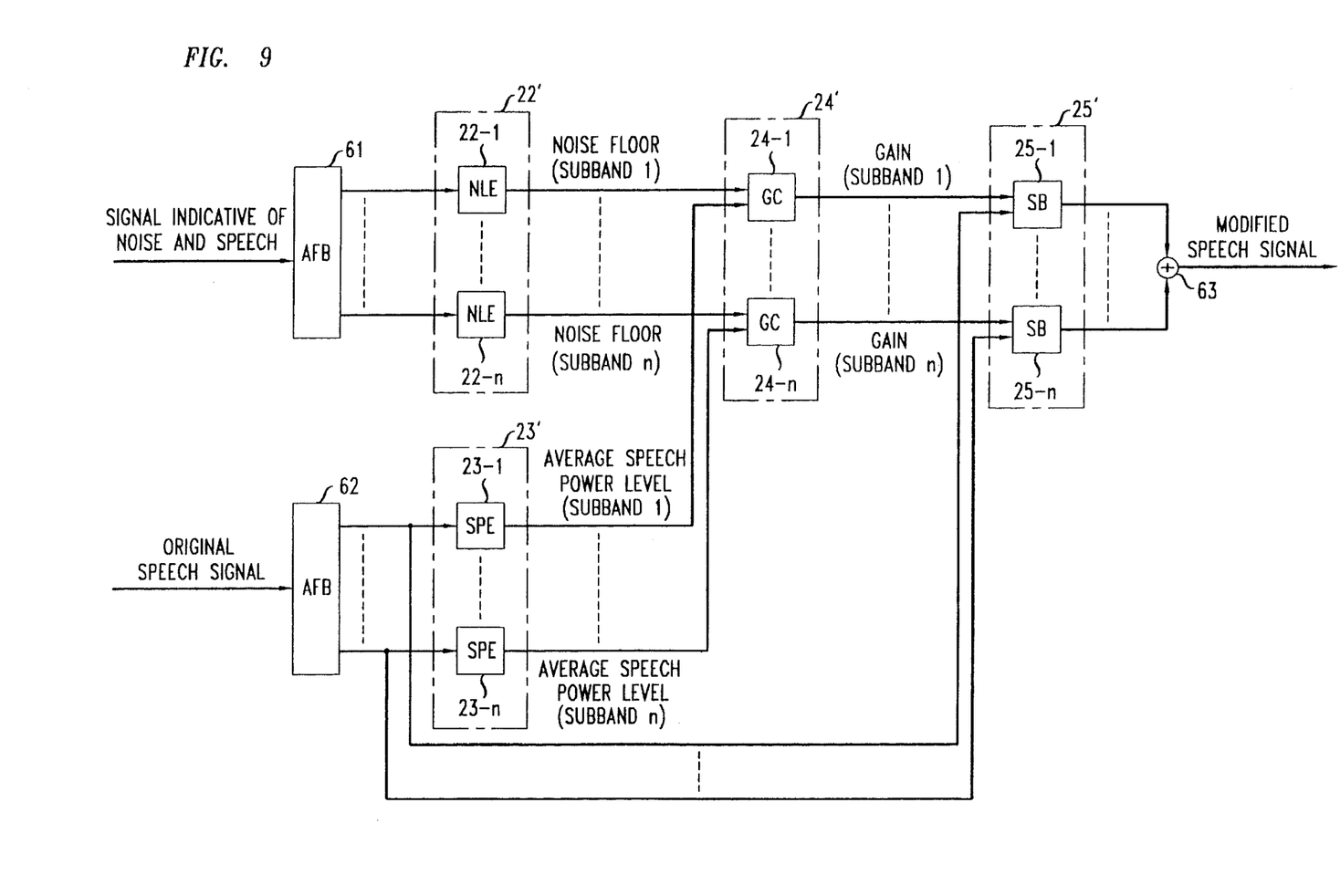
FIG. 9 shows a system-level diagram of a multiband-based illustrative embodiment of the present invention in which noise compensation is performed in individual sub-bands.

FIG. 9 shows a system-level diagram of a multiband-based illustrative embodiment of the present invention in which noise compensation is performed in individual (frequency) subbands. By performing noise compensation independently in distinct subbands, the noise energy in one frequency band will not affect the gain applied to the original speech signal at other frequencies. For example, high energy, low frequency components in the original speech signal will advantageously not affect the gain applied to the high frequency components of the signal. In general, multiband-based noise compensation permits better adaptation to the spectral characteristics of the background noise.

The structure and operation of the illustrative multiband system corresponds generally to that of the broadband system of FIG. 2. However, each of the processes performed by the broadband system of FIG. 2 is performed by the multiband system of FIG. 9 in a plurality of independent subbands. In particular, each of the four components shown in FIG. 2 may be replaced by a plurality of corresponding "copies" of the given component, each of which operates on one of the n subbands into which each of the input signals is separated. Since subband-based processing of speech and audio signals is well known, the following description provides an overview of the multiband implementation of FIG. 9.

Specifically, multiband noise compensation system 14' comprises analysis filter banks 61 and 62, noise level estimation 22', speech power estimation 23', gain computation 24', and signal boost 25' and adder 63. (Units which correspond to those of the broadband system of FIG. 2 have been assigned the same numbers with an added "prime" mark.) Each of the two input signals—the noise-indicative signal and the original speech signal—are separated into a corresponding set of n subband signals by analysis filter banks 61 and 62 in a conventional manner. Advantageously, these two filter banks are identical so that the two signals are separated into corresponding sets of subband signals having exactly the same frequency band structure.

Noise level estimation 22' comprises subband noise level estimation 22-1, . . . 22-n; speech power estimation 23' comprises subband speech power estimation 23-1, . . . 23-n; gain computation 24' comprises subband gain computation 24-1, . . . 24-n; and signal boost 25' comprises subband signal boost 25-1, . . . 25-n. Each corresponding set of components 22-i, 23-i, 24-i and 25-i (corresponding to the i'th subband) have a corresponding internal structure and operate in an analogous manner to components 22, 23, 24 and 25 of broadband noise compensation system 14 of FIG. 2. After the speech signal as divided into subbands has been appropriately modified in each of these subbands (by subband signal boost 25-1 . . . 25-n), adder 63 combines the resultant modified subband speech signals to produce the final modified speech signal for use at the destination. Adder 63 is of conventional design.

In an alternative multiband embodiment, speech power estimation is not performed in subbands. In this case, speech power estimation 23 of the broadband system of FIG. 2 may be used in place of speech power estimation 23', providing its output signal (average speech power level) to each of the subband gain computation components (24-1, . . . 24-n). That is, this alternate embodiment provides gain factors in each subband which are inversely proportional to the overall speech power level of the original speech signal as a whole, rather than to the power level in each subband individually.

Although the individual subband components of multiband noise compensation system 14' correspond to the components of noise compensation system 14, the various parameters (e.g., the noise scale factor, the maximum permitted gain factor, the minimum speech level, etc.) described in connection with noise compensation system 14 above may be advantageously assigned different values in the different subband implementations. For example, in a multiband compression system, the release time of peak detector 51 in a higher frequency band may be advantageously set lower than the release time for a corresponding peak detector in a lower frequency band.

For clarity of explanation, the illustrative embodiment of the present invention is presented as comprising individual functional blocks. The functions that these blocks represent may be provided through the use of either shared or dedicated hardware, including, but not limited to, hardware capable of executing software. For example, the functions of processors presented in the various figures may be provided by a single shared processor. (Use of the term "processor" should not be construed to refer exclusively to hardware capable of executing software.)

Illustrative embodiments may comprise digital signal processor (DSP) hardware, read-only memory (ROM) for storing software perforating the operations discussed below, and random access memory (RAM) for storing DSP results. Very large scale integration (VLSI) hardware embodiments, as well as custom VLSI circuitry in combination with a general purpose DSP circuit, may also be provided.

Although a number of specific embodiments of this invention have been shown and described herein, it is to be understood that these embodiments are merely illustrative of the many possible specific arrangements which can be devised in application of the principles of the invention. Numerous and varied other arrangements can be devised in accordance with these principles by those of ordinary skill in the art without departing from the spirit and scope of the invention.

We claim:

1. A method of processing an original speech signal in a telephone set to produce a final speech signal, the original speech signal having been communicated over a telephone network to a destination at which the telephone set is located, the destination having background noise thereat, the method comprising the steps of:

generating a background-noise-indicative signal indicative of the background noise at the destination;

separating the original speech signal into a plurality of original subband speech signals;

separating the background-noise-indicative signal into a plurality of subband-noise-indicative signals corresponding to the plurality of original subband speech signals;

applying a corresponding subband gain to each original subband speech signal to produce a corresponding plurality of modified subband speech signals, wherein each subband gain is a function of the corresponding subband-noise-indicative signal;

combining the plurality of modified subband speech signals to produce the modified speech signal; and combining a side tone with the modified speech signal to produce the final speech signal.

2. The method of claim 1 wherein each subband-noise-indicative signal is characterized by a time-varying signal level and wherein each subband gain is a function of the signal level of the corresponding subband-noise-indicative signal measured over a first predetermined time period.

3. The method of claim 1 wherein each subband gain is a further function of the corresponding original subband speech signal.

4. The method of claim 3 wherein each subband gain is a further function of an energy level of the corresponding original subband speech signal measured over a second predetermined time period.

5. The method of claim 1 wherein each subband gain is a further function of the original speech signal.

6. The method of claim 5 wherein each subband gain is a further function of an energy level of the original speech signal measured over a second predetermined time period.

7. The method of claim 1 wherein each original subband speech signal is characterized by a time-varying signal level, wherein each subband gain is a further function of the signal level of the corresponding original subband speech signal, and wherein the subband gain applied to the original subband speech signal when it is at a first signal level is greater than the subband gain applied to the original subband speech signal when it is at a second signal level greater than said first signal level.

8. The method of claim 1 wherein the background-noise-indicative signal comprises a noise-and-speech-indicative signal indicative of both the background noise and speech, and wherein the step of applying the subband gains includes the step of determining when said noise-and-speech-indicative signal does not include speech and determining the subband gains at such times.

9. A telephone set for use at a location having background noise thereat, the telephone set comprising:

means for receiving an original speech signal, the original speech signal having been communicated to the telephone set by a telephone network, the original speech signal being substantially free of the background noise;

means for separating the original speech signal into a plurality of original subband speech signals;

means for generating a background-noise-indicative signal indicative of the background noise;

means for separating the background-noise-indicative signal into a plurality of subband-noise-indicative signals corresponding to the plurality of original subband speech signals;

means for applying a corresponding gain to each original subband speech signal to produce a corresponding plurality of modified subband speech signals, wherein each subband gain is a function of the corresponding subband-noise-indicative signal; and means for combining the plurality of modified subband speech signals to produce a modified speech signal.

10. The telephone set of claim 9 wherein each subband-noise-indicative signal is characterized by a time-varying signal level, the telephone set further comprising a corresponding plurality of means for measuring the signal level of each corresponding subband-noise-indicative signal over a first predetermined time period, wherein each subband gain is a function of said corresponding measured level.

11. The telephone set of claim 9 further comprising a corresponding plurality of means for determining an energy level of each corresponding original subband speech signal measured over a second predetermined time period, wherein each subband gain is a further function of said corresponding energy level.

12. The telephone set of claim 9 further comprising means for determining an energy level of the original speech signal measured over a second predetermined time period, wherein each subband gain is a function of said energy level.

13. The telephone set of claim 9 further comprising a corresponding plurality of means for determining each subband gain, wherein each original subband speech signal is characterized by a time-varying signal level, wherein each subband gain is a further function of the signal level of the corresponding original subband speech signal, and wherein the subband gain determined when the corresponding original subband speech signal is at a first signal level is greater than the subband gain determined when the corresponding original subband speech signal is at a second signal level greater than said first signal level.

14. The telephone set of claim 9 wherein the background-noise-indicative signal comprises a noise-and-speech-indicative signal indicative of both the background noise and speech, and wherein the means for applying the subband gains includes means, applied to said noise-and-speech-indicative signal, for determining when said noise-and-speech-indicative signal does not include speech and determining the subband gains at such times.

15. The telephone set of claim 9 further comprising:

means for combining a side tone with the modified speech signal to produce a final speech signal.

* * * * *